United States Patent
Moon et al.

(10) Patent No.: US 9,438,314 B2
(45) Date of Patent: Sep. 6, 2016

(54) APPARATUS AND METHOD FOR WIRELESSLY TRANSMITTING AND RECEIVING ENERGY AND DATA

(71) Applicant: Electronics and Telecommunications Research Institute, Daejeon (KR)

(72) Inventors: Jung Ick Moon, Daejeon (KR); In Kui Cho, Daejeon (KR); Seong Min Kim, Daejeon (KR); Je Hoon Yun, Daejeon (KR); Woo Jin Byung, Daejeon (KR); Kwang Seon Kim, Daejeon (KR); Bong Su Kim, Daejeon (KR); Min Soo Kang, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 765 days.

(21) Appl. No.: 13/909,532

(22) Filed: Jun. 4, 2013

(65) Prior Publication Data

US 2013/0257174 A1    Oct. 3, 2013

Related U.S. Application Data

(62) Division of application No. 13/292,602, filed on Nov. 9, 2011, now Pat. No. 8,478,212.

(30) Foreign Application Priority Data

Dec. 17, 2010    (KR) .......................... 10-2010-130309

(51) Int. Cl.
| | | |
|---|---|---|
| *H04B 5/00* | (2006.01) | |
| *H01Q 1/24* | (2006.01) | |
| *H01Q 21/28* | (2006.01) | |

(52) U.S. Cl.
CPC ............ *H04B 5/0037* (2013.01); *H01Q 1/248* (2013.01); *H01Q 21/28* (2013.01)

(58) Field of Classification Search
CPC ....................................................... H02J 5/005
USPC ........................................................ 307/104
See application file for complete search history.

(56) References Cited

U.S. PATENT DOCUMENTS 6,850,750 B2    2/2005    Takaki et al.
7,065,163 B2    6/2006    Rick et al.
(Continued)

FOREIGN PATENT DOCUMENTS

KR    10-2010-066339    6/2010

OTHER PUBLICATIONS

U.S. Patent Restriction Requirement mailed Jan. 9, 2013 in corresponding U.S. Appl. No. 13/292,602.
(Continued)

*Primary Examiner* — Robert Deberadinis
(74) *Attorney, Agent, or Firm* — Staas & Halsey LLP

(57) ABSTRACT

A method for wirelessly receiving energy and data, including: a resonation operation of resonating a first frequency power signal transmitted from a transmission apparatus; a reception operation of receiving a second frequency data signal transmitted from the transmission apparatus; a first matching operation of matching input/output impedance upon receiving the first frequency power signal; a rectification operation of rectifying impedance-matched power signal from the first matching operation into a DC current; a second matching operation of matching input/output impedance upon receiving the second frequency data signal; an oscillation operation of outputting a second frequency signal by using the first frequency signal output from the resonation operation, as a reference frequency; and a frequency mixing operation of mixing the impedance-matched data signal from the second matching operation with the signal output from the oscillation operation to restore a baseband data signal.

8 Claims, 3 Drawing Sheets

(56) References Cited

U.S. PATENT DOCUMENTS

| | | |
|---|---|---|
| 7,536,164 B2 | 5/2009 | Maligeorgos et al. |
| 7,636,579 B2 | 12/2009 | Eskildsen |
| 7,706,494 B2 | 4/2010 | Iida |
| 2009/0257522 A1 | 10/2009 | Kuwano |
| 2010/0190436 A1 | 7/2010 | Cook et al. |

OTHER PUBLICATIONS

U.S. Patent Notice of Allowance mailed Mar. 6, 2013 in corresponding U.S. Appl. No. 13/292,602.

U.S. Patent Supplemental Notice of Allowance with Examiner-Initiated Interview Summary mailed Apr. 3, 2013 in corresponding U.S. Appl. No. 13/292,602.

U.S. Appl. No. 13/292,602, filed Nov. 9, 2011, Jung Ick Moon et al., Electronics and Telecommunications Research Institute.

APPARATUS AND METHOD FOR WIRELESSLY TRANSMITTING AND RECEIVING ENERGY AND DATA

CROSS-REFERENCE TO RELATED APPLICATIONS

This application is a U.S. divisional application filed under 37 CFR 1.53(b) claiming priority benefit of U.S. Ser. No. 13/292,602 filed in the United States on Nov. 9, 2011, which claims foreign priority benefit to Korean Patent Application No. 10-2010-0130309 filed with the Korean Intellectual Property Office on Dec. 17, 2010, the disclosures of which are incorporated herein by reference.

BACKGROUND

1. Field

The present disclosure relates to an apparatus and method for wirelessly transmitting and receiving energy and data, and more particularly, to an apparatus and method for wirelessly transmitting and receiving energy and data capable of wirelessly transferring electrical energy and performing large capacity and high efficiency communication by using a resonant structure.

2. Description of the Related Art

A technique of wirelessly transferring energy is similar to telecommunication using an antenna in a broad sense. However, when energy is wirelessly transferred within a short distance, since energy is transmitted within a very short distance in a wavelength, energy transmission efficiency, as well as directivity and a radiation pattern, is very significant.

Recently, a technique of transferring a large capacity energy such as charging of an electrical vehicle, as well as a technique of wirelessly (or in a non-contact manner) transferring energy to an electronic product consuming a small amount of power, such as mobile phones, notebook computers, or the like, to operate the product, has come to prominence. Furthermore, various products that can perform both energy transmission and communication are anticipated to be developed in the future. Subsequently, a receiving device that is able to be provided with power from a transmission unit and performs a communication function, even without a power source, is the next generation in electronics, and this will possibly result in a reduction in the size of the receiving device.

US Patent Publication No. 2010/0190436 A1 entitled "Concurrent wireless power transmission and near-field communication" discloses a similar technique of performing both energy transmission and communication. This document proposes a system for performing wireless power transmission and communication.

However, the technique presented in the above document performs communication limited to a near field by using the same frequency as that of wireless power transmission, and uses a low frequency, having disadvantages in that it is very vulnerable to large capacity data transmission.

Thus, a technique which is able to transmit large capacity data with high efficiency while simultaneously performing wireless power transmission and communication is required.

SUMMARY

The present disclosure has been made in an effort to provide an apparatus and method for wirelessly transmitting and receiving energy and data having both an energy transmission function for effectively transmitting electrical energy wirelessly and a communication function for transmitting large capacity data at a high speed by using a resonant structure.

An exemplary embodiment of the present disclosure provides an apparatus for wirelessly transmitting energy and data, including: a signal generator generating a first frequency signal for power transmission; a first matching circuit matching input/output impedance upon receiving the first frequency signal generated by the signal generator; an oscillator outputting a second frequency signal, a carrier frequency, by using the first frequency signal generated by the signal generator, as a reference frequency; a mixer modulating a data signal output from a communication module by using the second frequency signal; a second matching circuit matching input/output impedance upon receiving a modulated signal by using the second frequency signal; a resonator resonating an output signal from the first matching circuit to a reception side apparatus; and a radiator radiating an output signal from the second matching circuit to the reception side apparatus.

Another exemplary embodiment of the present disclosure provides an apparatus for wirelessly receiving energy and data, including: a resonator resonating a first frequency power signal transmitted from a transmission apparatus; a radiator receiving a second frequency data signal transmitted from the transmission apparatus; a first matching circuit matching input/output impedance upon receiving the first frequency power signal; a rectifier rectifying an impedance-matched power signal from the first matching circuit into a DC current; a second matching circuit matching input/output impedance upon receiving the second frequency data signal; an oscillator outputting a second frequency signal by using a first frequency signal output from the resonator as a reference frequency; and a mixer mixing impedance-matched data signal from the second matching circuit with a signal output from the oscillator to restore a baseband data signal.

Another exemplary embodiment of the present disclosure provides a method for wirelessly transmitting energy and data, including: a signal generation operation of generating a first frequency signal for power transmission; a first matching operation of matching input/output impedance upon receiving the first frequency signal generated at the signal generation operation; an oscillation operation of outputting a second frequency signal, a carrier frequency, by using the first frequency signal, generated at the signal generation operation, as a reference frequency; a modulation operation of modulating a data signal output from a communication module by using the second frequency signal; a second matching operation of matching input/output impedance upon receiving the signal modulated by using the second frequency signal; a resonation operation of resonating a signal output from the first matching operation to a reception side apparatus; and a radiation operation of radiating a signal output from the second matching operation to the reception side apparatus.

Another exemplary embodiment of the present disclosure provides a method for wirelessly receiving energy and data, including: a resonation operation of resonating a first frequency power signal transmitted from a transmission apparatus; a reception operation of receiving a second frequency data signal transmitted from the transmission apparatus; a first matching operation of matching input/output impedance upon receiving the first frequency power signal; a rectification operation of rectifying impedance-matched power signal from the first matching operation into a DC current; a second matching operation of matching input/ output impedance upon receiving the second frequency data signal; an oscillation operation of outputting a second frequency signal by using the first frequency signal output from the resonation operation, as a reference frequency; and a frequency mixing operation of mixing the impedance-matched data signal from the second matching operation with the signal output from the oscillation operation to restore a baseband data signal.

Another exemplary embodiment of the present disclosure provides an apparatus for wirelessly transmitting energy and data, including: a signal generator generating a first frequency signal for power transmission; a first matching circuit matching input/output impedance upon receiving the first frequency signal from the signal generator; a frequency multiplier multiplying the first frequency signal generated by the signal generator into a second frequency signal of an integer multiple; a mixer modulating a data signal output from a communication module by using the second frequency signal; a second matching circuit matching input/output impedance upon receiving a modulated signal by using the second frequency signal; a resonator resonating an output signal from the first matching circuit to a reception side apparatus; and a radiator radiating an output signal from the second matching circuit to the reception side apparatus.

Another exemplary embodiment of the present disclosure provides an apparatus for wirelessly receiving energy and data, including: a resonator resonating a first frequency power signal transmitted from a transmission apparatus; a radiator receiving a second frequency data signal obtained by integer-multiplying the first frequency signal; a first matching circuit matching input/output impedance upon receiving the first frequency power signal resonated by the resonator; a frequency multiplier multiplying the first frequency power signal resonated by the resonator into a second frequency signal of an integer multiple; a rectifier rectifying the impedance-matched power signal from the first matching circuit into a DC current; a second matching circuit matching input/output impedance upon receiving second frequency data signal received from the radiator; and a mixer mixing the impedance-matched data signal from the second matching circuit and a signal output from the frequency multiplier to restore a baseband data signal.

Another exemplary embodiment of the present disclosure provides a method for wirelessly transmitting energy and data, including: a signal generation operation of generating a first frequency signal for power transmission; a first matching operation of matching input/output impedance upon receiving the first signal generated at the signal generation operation; a frequency multiplication operation of multiplying the first frequency signal generated at the signal generation operation into a second frequency signal of an integer multiple; a modulation operation of modulating a data signal output from a communication module by using the second frequency signal; a second matching operation of matching input/output impedance upon receiving the signal modulated by using the second frequency signal; and a resonation and radiation operation of resonating and radiating the signals output from the first and second matching operations to a reception side apparatus, respectively.

Another exemplary embodiment of the present disclosure provides a method for wirelessly receiving energy and data, including: a resonation and reception operation of resonating and receiving a first frequency power signal transmitted from a transmission apparatus and a second frequency data signal obtained by integer-multiplying the frequency signal; a first matching operation of matching input/output impedance upon receiving the resonated first frequency power signal; a rectification operation of rectifying the impedance-matched power signal from the first matching operation into a DC current; a frequency multiplication operation of multiplying the resonated first frequency power signal into a second frequency signal of an integer multiple; a second matching operation of matching input/output impedance upon receiving the received second frequency data signal; and a frequency mixing operation of mixing the impedance-matched data signal from the second matching operation with the signal multiplied at the frequency multiplication operation to restore a baseband data signal.

According to exemplary embodiments of the present disclosure, a function of simultaneously performing wireless power transmission and communication is implemented in a single system. In particular, the system simultaneously uses a radio frequency, which is used for power transmission, as a reference frequency of a sub-system for communication, so the system can be simplified, and because various modules and operations required for determining a reference signal in a transmission and reception system are not required, the system performance can be improved.

Since the frequency, which is multiplied by a few or tens of times a power transmission frequency, is used for far field communication, a resonator and a radiator can be integrally implemented, reducing the size of the system and transmitting large quantity data at a high speed.

The foregoing summary is illustrative only and is not intended to be in any way limiting. In addition to the illustrative aspects, embodiments, and features described above, further aspects, embodiments, and features will become apparent by reference to the drawings and the following detailed description.

DESCRIPTION OF EMBODIMENTS

In the following detailed description, reference is made to the accompanying drawing, which form a part hereof. The illustrative embodiments described in the detailed description, drawing, and claims are not meant to be limiting. Other embodiments may be utilized, and other changes may be made, without departing from the spirit or scope of the subject matter presented here.

In an exemplary embodiment of the present disclosure, unlike a power transmission frequency f0, a frequency of a few to hundreds of times greater than f0 is used as a communication frequency. For example, when a power transmission frequency used in the current technology is smaller than 10 MHz, the communication frequency may be tens of GHz. Thus, a power transmission distance may be a few centimeters to tens of centimeters, which mostly belongs to a near field. However, for a frequency used for communication which works in a far field, an antenna using a radiation phenomenon, not a resonance phenomenon, is applied.

The reason why there is a wide difference between the power transmission frequency and the communication frequency is because when large capacity data is transmitted at a high speed, it is better to use a high frequency, including interference between the identical frequencies. In particular, the use of a millimeter-wave band can be quite advantageous because of a small attenuation at a relative short distance.

Meanwhile, in the related art, a resonator and a radiator are separately used for power transmission (i.e., energy transmission) and data transmission, but in an exemplary embodiment of the present disclosure, a resonator and radiator member is implemented as a single component which plays the roles of both the resonator and the radiator. Such can be implemented in an exemplary embodiment of the present disclosure because a communication frequency is raised to be a multiple of a power transmission frequency for a transmission.

Namely, in general, a resonator and a radiator largely use a basic resonant state, and here, a similar resonant or radiative phenomenon occurs at a multiple of the frequency in which the basic resonant takes place. Thus, according to an exemplary embodiment of the present invention, when a frequency, which is multiplied a few or tens of times as the power transmission frequency, is used for communication, a resonator and a radiator can be integrally configured, reducing the size of a system.

Accordingly, in an exemplary embodiment of the present disclosure, since wireless energy transmission is made at a low frequency while communication is made at a high frequency concurrently, the distance between a transmitter and receiver is a short distance (i.e., a near field) in terms of power transmission and is a long distance (i.e., a far field) in terms of communication.

Figure 1:
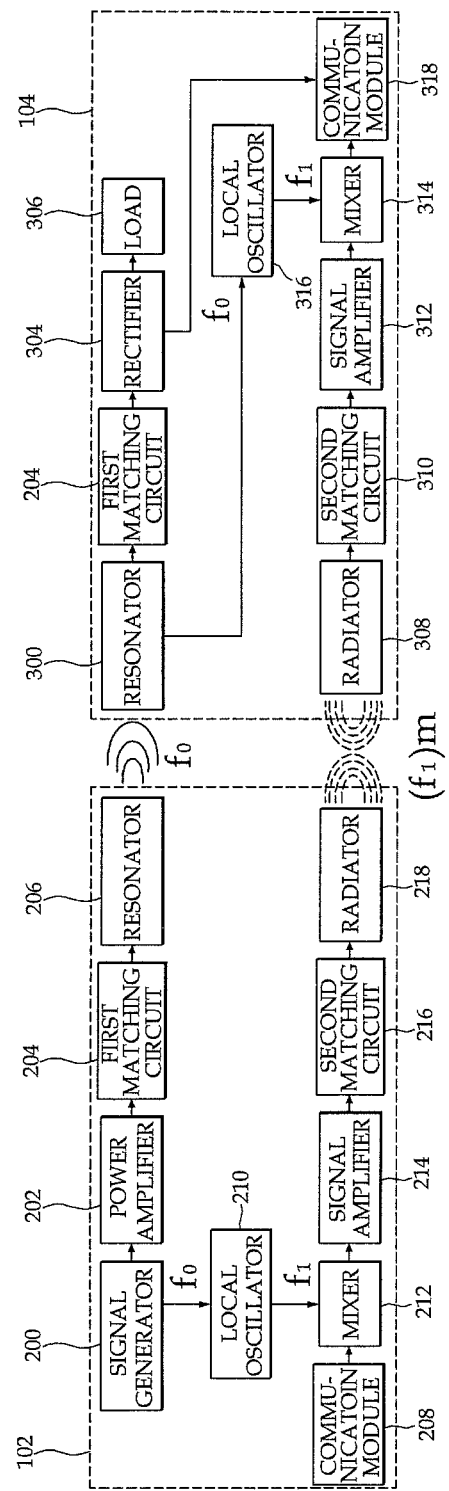
FIG. 1 is a view showing the configuration of an apparatus for transmitting and receiving wireless energy and data according to a first exemplary embodiment of the present disclosure.

FIG. 1 is a view showing the configuration of an apparatus for wirelessly transmitting and receiving energy and data according to a first exemplary embodiment of the present disclosure.

With reference to FIG. 1, a transmission apparatus 102 may be configured to include a signal generator 200, a power amplifier 202, a first matching circuit 204, a resonator 206, a communication module 208, a local oscillator 210, a mixer 212, a signal amplifier 214, a second matching circuit 216, and a radiator 218. In FIG. 1, f0 refers to a frequency for power transmission and f1 refers to frequency used for communication.

As for an energy transmission process, energy having frequency f0 is generated by signal generator 200 and transmitted to resonator 206 through power amplifier 202 and first matching circuit 204. The energy transmitted to resonator 206 is transferred to a reception side resonator 300 by using a resonance phenomenon so as to be used as power for a load or a communication module of a reception apparatus 104.

As for a data transmission process, a data signal generated by communication module 208 is mixed with a carrier frequency signal provided from local oscillator 210 through frequency mixer 212, and amplified through signal amplifier 214. And then, the amplified signal is transmitted to radiator 218 through second matching circuit 216. Radiator 218 follows an operational principle of a general antenna, and is received by a reception side radiator 308 (e.g., an antenna).

Reception apparatus 104 may be configured to include a resonator 300, a first matching circuit 302, a rectifier 304, a load 306, a radiator 308, a second matching circuit 310, an amplifier 312, a mixer 314, a local oscillator 316, a communication module 318, and the like.

As for an energy reception process of reception apparatus 104, energy of frequency f0 is transferred to resonator 300 of reception apparatus 104 through a resonance phenomenon with resonator 206 of transmission apparatus 102, and the transferred energy passes through reception side first matching circuit 302 and is rectified into a DC current by rectifier 304. The rectified current is used as power for load 306 or communication module 318 which can be replaced with a charger or a battery.

As for a data reception process of reception apparatus 104, a signal, i.e., (f1)m, which has been modulated by using data signal f1 frequency of frequency f1 transmitted through radiator 218 or an antenna of transmission apparatus 102, is received through radiator 308 or an antenna of reception apparatus 104, and then transferred to signal amplifier 312 through second matching circuit 310. Signal amplifier 312 amplifies the reception signal. Local oscillator 316 generates a carrier frequency signal by using frequency f0 provided from resonator 300 or first matching circuit 302, and transfers the generated carrier frequency signal to frequency mixer 314. Frequency mixer 314 mixes an output signal from signal amplifier 312 and an output from local oscillator 316 to restore an original data signal. The restored data signal is provided to communication module 318.

Meanwhile, the data signal can be transmitted in a reverse direction. Namely, the data signal transmitted from communication module 318 of reception apparatus 104 is transmitted to transmission apparatus 102 through mixer 314, amplifier 312, second matching circuit 310, and radiator 308, and upon receiving the data transmitted from reception apparatus, transmission apparatus 102 restores the data signal.

Figure 2:
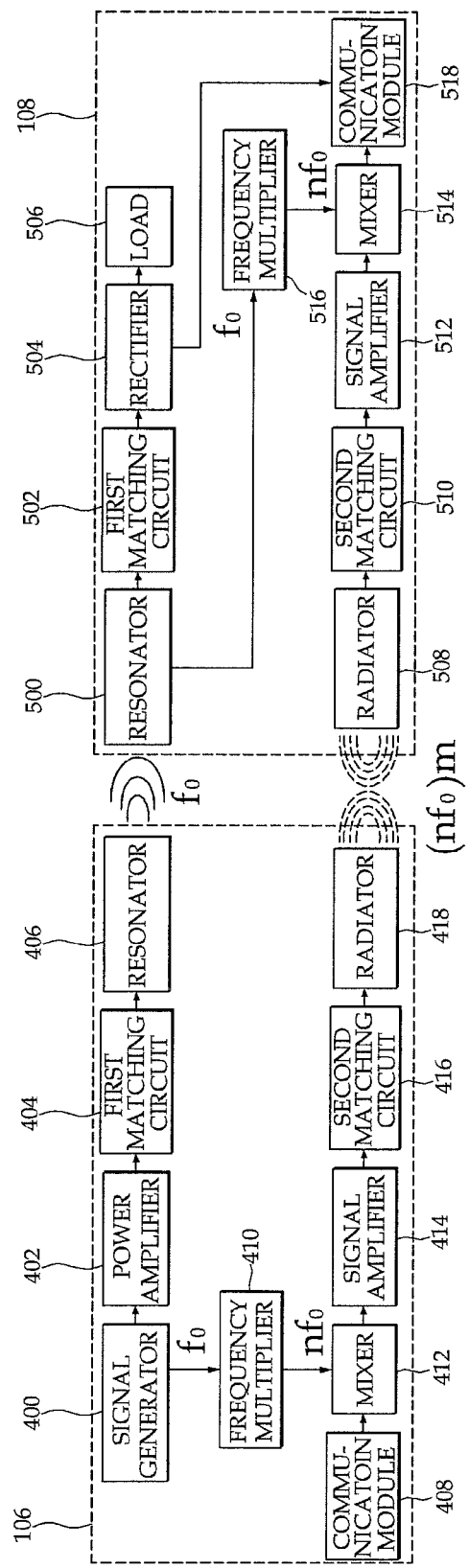
FIG. 2 is a view showing the configuration of an apparatus for wirelessly transmitting and receiving energy and data according to a second exemplary embodiment of the present disclosure.

FIG. 2 is a view showing the configuration of an apparatus for wirelessly transmitting and receiving energy data according to a second exemplary embodiment of the present disclosure.

In the second exemplary embodiment of FIG. 2, likewise as in the first exemplary embodiment of FIG. 1, frequency for power transmission is generated by a signal generator 400, the same signal source. However, the frequency generated by signal generator 400 is output as an integer multiple frequency through a frequency multiplier 410.

Energy and a data signal transmitted from a transmission apparatus 106 are received through a resonator 500 and a radiator 508 of a reception apparatus 108. The energy is transferred to a first matching circuit 502, and the data signal is transferred to a second matching circuit 510. Matching circuits 502 and 510 are previously designed to be matched to different frequencies.

In detail, transmission apparatus 106 according to the second exemplary embodiment of the present disclosure may be configured to include a signal generator 400, a power amplifier 402, a first matching circuit 404, a resonator 406, a communication module 408, frequency multiplier 410, a mixer 412, a signal amplifier 414, a second matching circuit 416, a radiator 418, and the like.

In FIG. 2, f0 is frequency for power transmission, nf0 is a frequency obtained by multiplying the frequency for power transmission by an integer multiple, and (nf0)m refers to frequency used for communication as a modulation signal.

As for an energy transmission process, energy having frequency f0 is generated by signal generator 400 and transmitted to resonator 406 through power amplifier 402 and first matching circuit 404. The energy transmitted to resonator 406 is transferred to reception side resonator 500 by using a resonance phenomenon so as to be used as power for a load 506 and a communication module 518 of reception apparatus 108.

As for a data transmission process, frequency multiplier 410 multiplies a signal of frequency f0, generated by signal generator 400, by an integer (n) multiple. Mixer 412 mixes a data signal generated by communication module 408 and the frequency-multiplied signal to modulate the data signal. The modulated signal is amplified by signal amplifier 414 and transmitted to radiator 418 through second matching circuit 416. Radiator 418 follows an operational principle of a general antenna, and the data signal transmitted through radiator 406 is received by reception side radiator 508.

Meanwhile, reception apparatus 108 may be configured to include resonator 500, first matching circuit 502, a rectifier 504, load 506, radiator 508, second matching circuit 510, a signal amplifier 512, a mixer 514, a frequency multiplier 516, and communication module 518.

First, as for an energy reception process of reception apparatus 108, energy of frequency f0 is transferred to resonator 500 of reception apparatus 108 through a resonance phenomenon with resonator 406 of transmission apparatus 106, and the transferred energy passes through first matching circuit 501 and is rectified into a DC current by rectifier 504. The rectified current is used as power for load 506 or communication module 518.

As for a data reception process of reception apparatus 108, a data signal of a frequency nf0 transmitted through radiator 418 of transmission apparatus 106 is received by radiator 508 of reception apparatus 108 and transferred to signal amplifier 512 through second matching circuit 510. Signal amplifier 512 amplifies the received data signal. Mixer 514 mixes a carrier frequency signal provided from frequency multiplier 516 and the data signal output from signal amplifier 512 to restore the original data signal. The restored data signal is provided to communication module 518. Here, a reference frequency of frequency multiplier 516 is input from resonator 500 or first matching circuit 502.

Meanwhile, the data signal can be transmitted in a reverse direction. Namely, a data signal transmitted from communication module 518 of reception apparatus 108 is modulated into the data signal of frequency nf0 in mixer 514 and transmitted to transmission apparatus 106 through signal amplifier 512, second matching circuit 510, and radiator 508. Transmission apparatus 106 receives the data signal transmitted from reception apparatus 108 and restores the data signal.

Figure 3:
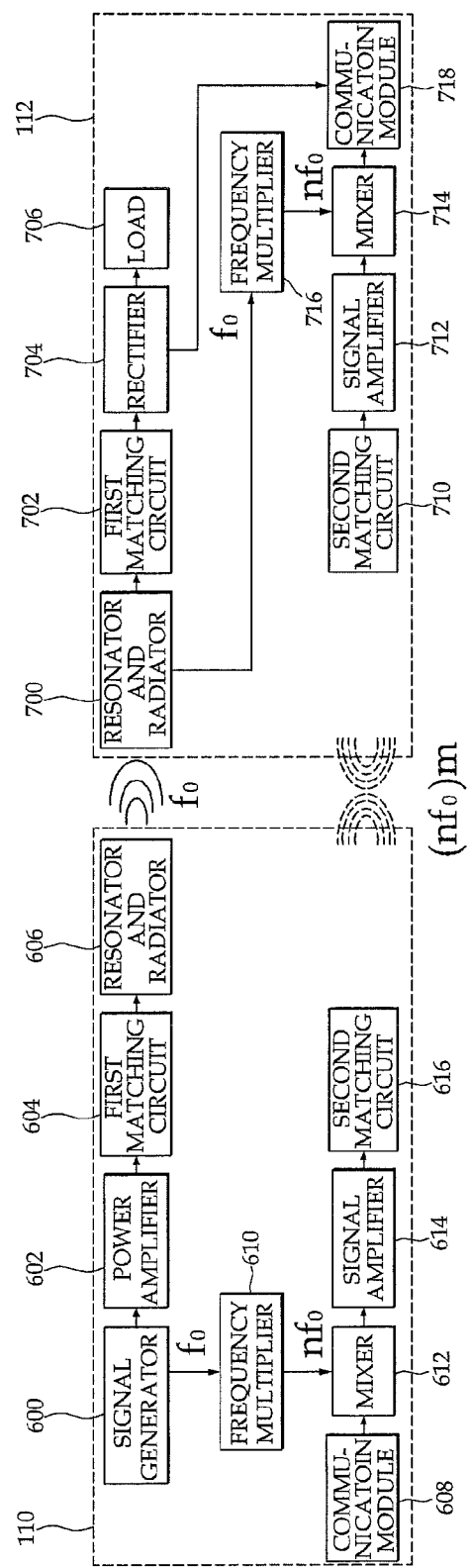
FIG. 3 is a view showing the configuration of an apparatus for wirelessly transmitting and receiving energy and data according to a third exemplary embodiment of the present disclosure.

FIG. 3 is a view showing the configuration of an apparatus for wirelessly transmitting and receiving energy data according to a third exemplary embodiment of the present disclosure.

In the third exemplary embodiment of FIG. 3, similar to the second exemplary embodiment of FIG. 2, the frequency for power transmission is generated by a signal generator 600, the same signal source. The frequency generated by signal generator 600 is output as an integer multiple frequency through a frequency multiplier 610.

Energy and a data signal transmitted from a transmission apparatus 110 are transferred to a resonator and radiator 700 of a reception apparatus 112. Here, the energy is transferred through a first matching circuit 702, and the data signal is transferred through a second matching circuit 710. The matching circuits 702 and 710 are previously designed to be matched to different frequencies.

In detail, transmission apparatus 110 according to the third exemplary embodiment of the present disclosure may be configured to include signal generator 600, a power amplifier 602, a first matching circuit 604, a resonator and radiator 606, a communication module 608, frequency multiplier 610, a mixer 612, a signal amplifier 614, a second matching circuit 616, and the like. In FIG. 3, f0 is a frequency for power transmission, and nf0 is frequency obtained by multiplying the frequency for power transmission by an integer multiple, which is used for communication.

First, as for an energy transmission process, energy having frequency f0 is generated by signal generator 600 and transmitted to resonator and radiator 606 through power amplifier 602 and first matching circuit 604. The energy transmitted to resonator and radiator 606 is transferred to reception side resonator and radiator 700 by using a resonance phenomenon so as to be used as power for a load 706 and a communication module 718 of reception apparatus 112.

As for a data transmission process, frequency multiplier 610 multiplies a signal of frequency f0, generated by signal generator 600, by an integer (n) multiple. Mixer 612 modulates a data signal generated by communication module 608 by using the frequency-multiplied signal. The modulated signal is amplified by signal amplifier 614 and transmitted through second matching circuit 616 to the identical resonator and radiator 606 which was used for the energy transmission. Resonator and radiator 606 follows an operational principle of a general antenna, and the data signal transmitted through the antenna of resonator and radiator 606 is received through an antenna of reception side resonator and radiator 700.

Meanwhile, reception apparatus 112 may be configured to include resonator and radiator 700, first matching circuit 702, a rectifier 704, load 706, second matching circuit 710, a signal amplifier 712, a mixer 714, a frequency multiplier 716, a communication module 718, and the like.

First, as for an energy reception process of reception apparatus 112, resonator and radiator 700 of reception apparatus 112 receives energy from frequency f0 through a resonance phenomenon with resonator and radiator 606 of transmission apparatus 110. The transferred energy passes through first matching circuit 702 and is rectified into a DC current by rectifier 704. The rectified current is used as power for load 706 or communication module 718.

Next, as for a data reception process of reception apparatus 112, a data signal of a frequency nf0 transmitted through resonator and radiator 606 (i.e., an antenna) of transmission apparatus 110 is received by resonator and radiator 700 (i.e., an antenna) of reception apparatus 112 and transferred to signal amplifier 712 through second matching circuit 710. Signal amplifier 712 amplifies the received signal, and the amplified signal is mixed with a carrier frequency signal provided from frequency multiplier 716 through frequency mixer 714 so as to be restored into the original data signal. The restored data signal is provided to communication module 718. Here, a reference frequency of frequency multiplier 716 is input from resonator 700 or first matching circuit 702.

Meanwhile, the data signal can be transmitted in a reverse direction. Namely, the data signal transmitted from communication module 718 of reception apparatus 112 is modulated into the data signal of frequency nf0 through mixer 714 and frequency multiplier 716 of reception apparatus 112 and transmitted to transmission apparatus 110 through signal amplifier 712, second matching circuit 710, and resonator and radiator 700. Transmission apparatus 110 receives the data signal transmitted from reception apparatus 112 and restores the data signal.

In this manner, in the exemplary embodiments of the present disclosure, the system designing and performance can be improved by utilizing the power transmission frequency as a reference frequency of the communication frequency, and an energy transmission and data transmission can be implemented by using a single resonator and radiator by using the fact that a resonant and radiative phenomenon occurs by a multiple of a fundamental frequency. To this end, as described above, the frequency signal used for energy transmission is multiplied by an integer multiple by using the frequency multiplier and re-used for data transmission, whereby effective energy transmission and data transmission can be simultaneously implemented.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed is:

1. An apparatus for wirelessly receiving energy and data, comprising:
   a resonator to resonate a first frequency power signal transmitted from a transmission apparatus;
   a radiator to receive a second frequency data signal transmitted from the transmission apparatus;
   a first matching circuit to match input/output impedance for the first frequency power signal upon receiving the first frequency power signal;
   a rectifier to rectify an impedance-matched power signal from the first matching circuit into a DC current;
   a second matching circuit to match input/output impedance for the second frequency data signal upon receiving the second frequency data signal;
   an oscillator to output a second frequency signal by using a first frequency signal output from the resonator as a reference frequency; and
   a mixer to mix an impedance-matched data signal from the second matching circuit with a signal output from the oscillator to restore a baseband data signal.

2. The apparatus of claim 1, further comprising a load to consume the DC current rectified by the rectifier.

3. The apparatus of claim 1, further comprising a signal amplifier to amplify the impedance-matched data signal from the second matching circuit and provide the amplified data signal to the mixer.

4. A method for wirelessly receiving energy and data, comprising:
   a resonation operation of resonating a first frequency power signal transmitted from a transmission apparatus;
   a reception operation of receiving a second frequency data signal transmitted from the transmission apparatus;
   a first matching operation of matching input/output impedance upon receiving the first frequency power signal;
   a rectification operation of rectifying impedance-matched power signal from the first matching operation into a DC current;
   a second matching operation of matching input/output impedance upon receiving the second frequency data signal;
   an oscillation operation of outputting a second frequency signal by using the first frequency signal output from the resonation operation, as a reference frequency; and
   a frequency mixing operation of mixing the impedance-matched data signal from the second matching operation with the signal output from the oscillation operation to restore a baseband data signal.

5. The method of claim 4, further comprising a signal amplification operation of amplifying the impedance-matched data signal, after the second matching operation.

6. An apparatus for wirelessly receiving energy and data, comprising:
   a resonator to resonate a first frequency power signal transmitted from a transmission apparatus;
   a radiator to receive a second frequency data signal which is an integer multiple of the first frequency signal;
   a first matching circuit to match input/output impedance for the first frequency power signal upon receiving the first frequency power signal resonated by the resonator;
   a frequency multiplier to multiply the first frequency power signal resonated by the resonator into a second frequency signal of an integer multiple;
   a rectifier to rectify the impedance-matched power signal from the first matching circuit into a DC current;
   a second matching circuit to match input/output impedance for the second frequency data signal upon receiving the second frequency data signal received from the radiator; and
   a mixer to mix the impedance-matched data signal from the second matching circuit and a signal output from the frequency multiplier to restore a baseband data signal.

7. The apparatus of claim 6, wherein the resonator and the radiator are integrally configured.

8. A method for wirelessly receiving energy and data, comprising:
   a resonation and reception operation of resonating and receiving a first frequency power signal transmitted from a transmission apparatus and a second frequency data signal obtained by integer-multiplying the first frequency signal;
   a first matching operation of matching input/output impedance upon receiving the resonated first frequency power signal;
   a rectification operation of rectifying the impedance-matched power signal from the first matching operation into a DC current;
   a frequency multiplication operation of multiplying the resonated first frequency power signal into a second frequency signal of an integer multiple;
   a second matching operation of matching input/output impedance upon receiving the received second frequency data signal; and
   a frequency mixing operation of mixing the impedance-matched data signal from the second matching operation with the signal multiplied in the frequency multiplication operation to restore a baseband data signal.

* * * * *